United States Patent [19]

Lytle et al.

[11] 4,052,713
[45] Oct. 4, 1977

[54] UNIVERSAL SNAP MOUNTING FOR DISPOSABLE CHART PENS

[75] Inventors: William F. Lytle, Orange; Thomas E. Cathcart, Jr., Lyme, both of Conn.

[73] Assignee: Waterbury Scroll Pen Corporation, Stratford, Conn.

[21] Appl. No.: 737,495

[22] Filed: Nov. 1, 1976

[51] Int. Cl.² ............................................. G01D 15/16
[52] U.S. Cl. .................................................. 346/140 A
[58] Field of Search ........................ 346/140 R, 140 A

[56] References Cited

U.S. PATENT DOCUMENTS

| | | | |
|---|---|---|---|
| 1,573,339 | 2/1926 | Watts | 346/140 A |
| 2,213,098 | 8/1940 | Smith | 346/140 A |
| 3,438,058 | 4/1969 | Davis | 346/140 A |
| 3,893,130 | 7/1975 | Browning et al. | 346/140 A |
| 3,934,255 | 1/1976 | Taylor | 346/140 A |
| 3,983,569 | 9/1976 | Hubbard et al. | 346/140 A |

Primary Examiner—George H. Miller, Jr.
Attorney, Agent, or Firm—H. Gibner Lehmann; K. Gibner Lehmann

[57] ABSTRACT

A universal, snap-on pen cartridge for attachment to the movable pen arm of a chart recorder, comprising a pen body having an ink reservoir and stylus connected therewith and adapted for engagement with a chart carried by the recorder, together with a resilient spring clip engageable with the body and adapted to clamp against an end portion of the recorder pen arm. The said end portion is substantially flat, and is held against a corresponding flat surface of the pen body. A raised portion on the body engages the end of the pen arm and constitutes a positioning device which supplements the clip action. The arrangement is such that assembly of the pen body to the arm can be quickly and easily effected, while at the same time there is provided a connection which is firm and free of undesirable looseness or slippage.

8 Claims, 7 Drawing Figures

U.S. Patent  Oct. 4, 1977  4,052,713
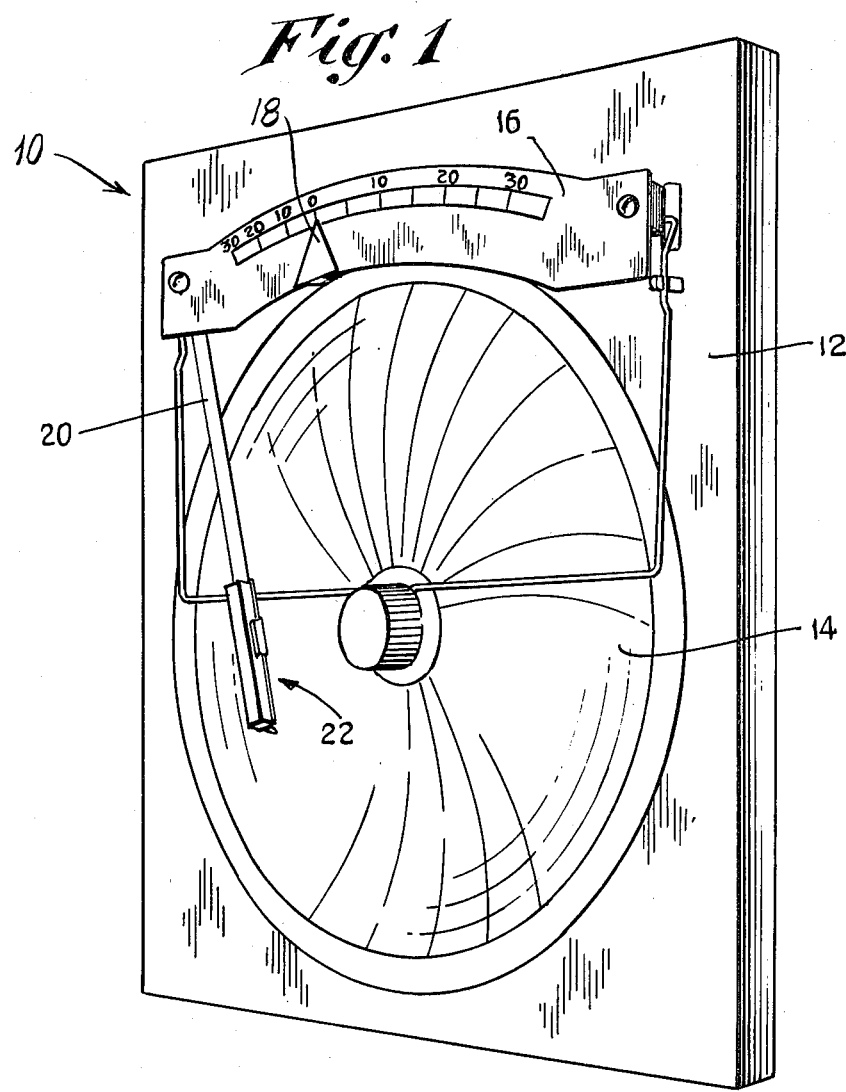
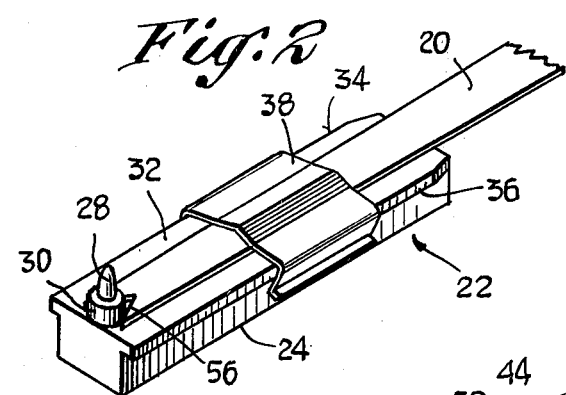
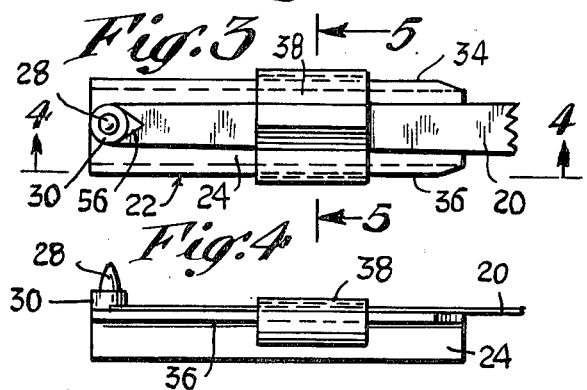
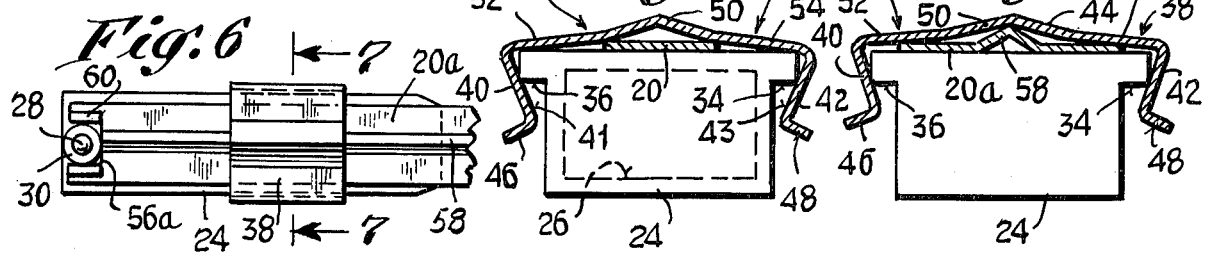

UNIVERSAL SNAP MOUNTING FOR DISPOSABLE CHART PENS

BACKGROUND

This invention relates generally to inking devices adapted for use with industrial chart recorders, and more particularly to self-contained devices of this type which can be readily disposed of after their intended period of use has expired.

In the past, various arrangements have been devised for enabling quick installation of a recording pen device on the actuator or writing arm of a chart recorder. Typically the body of the pen device was elongate, some having a longitudinal groove or recess which received the end portion of the pen arm. Normally the width of the groove was such that the arm could be merely slipped in place, thereafter being frictionally held by its engagement with the groove walls. Such grooves had to be of fixed width, molded or machined to close tolerances in order to assure a reasonably tight grip on the pen arm, yet one where interference would not occur. As a result, such devices had to be "tailored" to suit a particular type and size of pen or writing arm.

Still other constructions involved the use of integral plastic lugs protruding from the surface of the pen cartridge or body. The spacing of the lugs was such that the pen arm could be snapped or slipped into place between them, thereby securing together the two parts. This prior construction had the drawback that the lugs would break off; also, it suffered from the same disadvantage as pen bodies which had grooves, in that the tolerance on the spacing of the lugs was critical, and a particular pen body was normally useable with only one size or type of pen arm. Since chart recorders are manufactured by a number of different companies, there tends to be substantial variation in the dimensions of the pen arms associated therewith. This presented a problem in that a number of different pen cartridge types had to be available, in order to accommodate the different sizes and styles of chart recorders in the marketplace at any particular time. In addition, some replaceable pen cartridges were difficult to install and remove. Under such circumstances the likelihood of damaging the pen arm or bearings associated therewith was always present.

SUMMARY

The above disadvantages and drawbacks of prior pen cartridge devices are obviated by the present invention, which has for an object the provision of a novel and improved universal, snap-on pen cartridge for attachment to the writing arm of a chart recorder, the device being simple in construction, reliable in operation, and readily adaptable to a wide variety of different types of recorder units.

A related object of the invention is the provision of an improved cartridge as above, wherein the installation can be quickly and easily effected, and wherein the cartridge is as a rule self-orienting with respect to the pen arm.

Still another object of the invention is the provision of a pen cartridge device as characterized above, wherein simple parts are employed throughout, being mostly in the form of molded plastic casings and simple metal stampings.

The above objects are accomplished by the provision of a pen body having an ink reservoir and stylus connected therewith and adapted for engagement with the chart of a recorder, together with a resilient spring metal clip engageable with the body and adapted to clamp an end portion of the recorder writing arm thereagainst. The end portion of the writing arm is essentially flat, and bears against a corresponding flat surface of the pen body. The latter includes a raised portion adjacent the stylus, which engages the end of the writing arm and constitutes a positioning device therewith. Means are provided on the body, defining a pair of oppositely located shoulders into which corresponding detent portions on the legs of the clip can snap. Accordingly, assembly of the pen body to the arm can be quickly and easily effected, while at the same time there is provided a connection which is firm and especially free of undesirable looseness or slippage.

Other features and advantages will hereinafter appear.

In the drawings, illustrating sever embodiments of the invention:

FIG. 1 is a perspective view of a chart recorder incorporating the improved snap-on pen cartridge device of the present invention.

FIG. 2 is a perspective view of the underside of the improved, snap-on pen cartridge of the present invention, and a portion of the writing or pen arm of the recorder.

FIG. 3 is a bottom plan view of the cartridge of FIG. 2, carried by a writing arm shown in part.

FIG. 4 is a side elevational view along line 4—4 of FIG. 3.

FIG. 5 is a section taken on line 5—5 of FIG. 3.

FIG. 6 is a bottom plan view of a cartridge carried by a different pen arm of the type having a longitudinal stiffening rib.

FIG. 7 is a section taken on line 7—7 of FIG. 6.

Referring first to FIG. 1 there is illustrated a chart recorder generally designated by the numeral 10, including a housing 12 and a circular table turnably carried thereby and having a flat surface for accommodating circular sheets of recorder or chart paper 14. The recorder may optionally include a dial 16 having calibrated graduations as shown, and a pointer 18 associated therewith. Pivotally carried by the housing 12 is a movable pen or writing arm 20 which in turn carries a pen device 22 having an internal ink supply and a stylus to be described below, for engagement with the paper 14. The arm 20 is suitably mounted to maintain such engagement, and is driven by means of a servo mechanism including suitable amplifier and driver circuitry (not shown) carried within the housing 12. As particularly illustrated in FIGS. 2-5, the pen or cartridge device 22 of the invention comprises a body 24 having an ink reservoir 26 (illustrated in dotted outline FIG. 5), and a stylus 28 constituted of porous material and adapted for contact with the paper 14 of the recorder.

In accordance with the present invention, the pen device 22 incorporates a universal, snap-on connection adapted to engage the writing arm 20 of the recorder 10 for quick and easy assembly and disassembly of the cartridge as required during installation and replacement thereof. The novel snap-on connection includes means on the body 24 defining a pair of oppositely located shoulders 34, 36, and a resilient spring clip 38 having opposite leg portions 40, 42 engageable with said shoulders, and a connecting web portion 44. Detent means are provided on the leg portions 40, 42 in the form of inwardly extending ledges 41, 43 which are adapted to seat against underside edges of the shoulders 36, 34, to thereby hold the clip securely in the position of FIG. 2. The extremities of the legs 40, 42 have outwardly extending camming portions 46, 48 which momentarily urge the legs 40, 42 in an outward direction and away from one another when the spring clip is installed.

In accordance with the invention, as illustrated in FIGS. 2-5, the clip 38 has a centrally located raised portion characterized by a V-shaped cross-section designated by the numeral 50, and a pair of substantially coplanar flat clamping portions 52, 54 at opposite sides of the raised portion 50. As shown particularly in FIG. 5, the writing arm 20 is firmly clamped between a flat surface 32 of the pen body and the coplanar clamping portions 52, 54 of the spring clip. Such an arrangement has been found to provide a substantial shift-resisting connection between the arm 20 and the body 24, free of any looseness or slop whatsoever. Relative sidewise movement between the two parts is prevented by the strong clamping action of the flat portions 52, 54 on the opposite longitudinal sharp edges of the arm 20. In addition, such an arrangement provides a universal connection, capable of being used with a number of different writing arms having slightly different widths and/or thicknesses than those of the arm 20. Accordingly, it will be understood that with a slightly wider writing arm, adequate clamping will still occur by the flat portions 52, 54 of the clip, and the resistance of the connection to relative sidewise movement as noted above will still exist.

Further, in accordance with the invention, the end portion of the pen arm 20 is bifurcated, having a V-shaped cut-out 56. As shown in FIGS. 2 and 3, there is provided on the flat surface 32 a raised portion of tubular extension 30 on the body, the tubular extension being received in the cut-out 56, thereby constituting a positioning device for the end portion of the recorder arm. I have found that the combination of the spring clip 38 together with the tubular extension 30 provides a highly satisfactory connection between the pen arm 20 and the pen body 24. As can be readily seen, the parts are of extreme simplicity, involving a sheet metal stamping for the clip, and a molded plastic casing for the body 24. Preferably, the shoulders 34, 36 are molded integral with the body.

Another embodiment of the invention is illustrated in FIGS. 6 and 7 showing a somewhat modified arm 20a adapted for connection with the pen body 24. As shown, the arm 20a is elongate and has a central raised portion or rib 58 extending a substantial length therealong, for engagement with the underside of the spring clip 38 in the vicinity of its V-shaped portion 50. The arm 20a is substantially wider than the arm 20, and the longitudinal edge portions are firmly held between the flat surfaces 52 and 54 of the spring clip, thereby providing three distinct lines of contact. Two of the lines are adjacent the longitudinal sharp edges of the arm 20a, with the third line of contact being at the crest of the rib 58. As is the previous embodiment, the end portion of the arm 20a has a cut-out 56a which can be formed by slitting the end and folding back the metal as at 60, on opposite sides of the slit to form a rectangular opening. The tubular extension 30 is received in the cut-out 56a, as in the previous embodiment, to provide additional stability against relative lateral movement between the body and the arm.

The above construction has been found to have the following important advantages. The assemblage constiting of the body 24 and the clip 38 is useable with a wide variety of recording devices, thereby constituting a truly universal recorder pen device which can be quickly and easily installed on new equipment or alternately employed as a replacement device for other cartridges which have been exhausted. Installation can be undertaken by unskilled personnel, since the spring clip is self-seating and snaps into place with a pronounced click which can be easily discerned by the operator. Moreover, since installation involves but a simple movement, the likelihood of damage to the recorder arm from bending or prolonged handling is greatly minimized.

From the above it can be seen that we have provided a novel and improved recording pen device which is extremely simple in construction and reliable in operation. Excellent alignment of the pen body of the pen arm is maintained at all times, thereby reducing error which would be introduced otherwise, resulting from lateral or sidewise relative movement between the parts. The device is thus seen to represent a distinct advance and improvement in the technology of chart recorders.

Variations and modifications are possible without departing from the spirit of the invention.

I claim:

1. A universal, snap-on pen cartridge device for attachment to the moving pen arm of chart recorders, comprising in combination:
   a. pen body containing an ink reservoir and a stylus connected therewith, adapted for engagement with the paper carried by the recorder,
   b. said body having a raised portion adjacent the stylus, and having a substantially flat surface against which a corresponding flat part of the recorder arm can bear,
   c. a resilient metal clip attachable to said body, said clip having a generally U-shaped configuration, and including a pair of leg portions and a connecting web portion,
   d. means on said body located to be spaced from said body raised portion, defining a pair of oppositely located shoulders,
   e. detent means on the leg portions of said clip respectively for engagement with said opposite shoulders to thereby hold the clip captive on the body,
   f. said raised portion of the body being adapted for engagement with a cooperable end portion of the recorder pen arm to constitute a positioning device therewith.

2. The ivention as defined in claim 1, wherein:
   a. the raised portion of the body comprises an upstanding tubular projection surrounding and constituting a seat for the stylus.

3. The invention as defined in claim 1, wherein:
   a. the pen body is constituted of molded plastic, and the shoulders on the body are integral therewith.

4. The invention as defined in claim 1, wherein:
   a. the leg portions of the clip comprise outwardly extending camming portions which cause the leg portions to move in opposed directions when the detent means thereof bypasses the body shoulders during installation of the clip.

5. A universal snap-on pen cartridge device as defined in claim 1, in combination with:

a. an elongate, thin, flat and resilient pen arm of a recorder,
b. said pen arm having a bifurcated extremity in which the raised portion of the pen body is received,
c. the connecting web portion of said resilient clip continuously clamping said pen arm against said flat surface of the pen body,
d. said connecting web portion of the clip having a cross-sectional configuration characterized by a centrally located V-shape and a pair of substantially coplanar clamping flat portions located at opposite sides of the V-shape, said flat portions carrying the said leg portions of the clip,
e. the shoulder means on said body being so disposed relative to the substantially flat surface of the body that the detent means on the leg portions of the clip cause said clamping portions of the clip to be continuously strongly urged toward the flat surface of the pen body, thereby to clamp the pen arm of the recorder against lateral movement on the body regardless of clearance between the edges of the pen arm and the clip leg portions.

6. The invention as defined in claim 5, wherein:
a. the pen arm has a longitudinal stiffening rib,
b. said rib directly engaging the V-shape of the web portion of the clip when the latter is installed on the body.

7. The invention as defined in claim 1, and further including:
a. a pen arm,
b. the end portion of said pen arm having a bifurcated tip,
c. the raised portion of the body being received in said bifurcated tip and constituting a seat therefor.

8. The invention as defined in claim 7, wherein:
a. said bifurcated tip is constituted as two folded-back portions of the arm on opposite sides of a central slit.

* * * * *